US009725549B2

(12) United States Patent
Licht et al.

(10) Patent No.: US 9,725,549 B2
(45) Date of Patent: Aug. 8, 2017

(54) RADIATION-CURABLE MIXTURE CONTAINING LOW-MOLECULAR, ETHYLENICALLY UNSATURATED COMPOUNDS HAVING NON-AROMATIC RING SYSTEMS

(75) Inventors: Ulrike Licht, Mannheim (DE); Dirk Wulff, Schifferstadt (DE); Uwe Duesterwald, Queidersbach (DE)

(73) Assignee: BASF SE, Ludwigshafen (DE)

( * ) Notice: Subject to any disclaimer, the term of this patent is extended or adjusted under 35 U.S.C. 154(b) by 1284 days.

(21) Appl. No.: 12/441,670

(22) PCT Filed: Oct. 29, 2007

(86) PCT No.: PCT/EP2007/061623
§ 371 (c)(1),
(2), (4) Date: Mar. 17, 2009

(87) PCT Pub. No.: WO2008/049932
PCT Pub. Date: May 2, 2008

(65) Prior Publication Data
US 2009/0324945 A1   Dec. 31, 2009

(30) Foreign Application Priority Data
Oct. 27, 2006  (EP) .................................... 06123081

(51) Int. Cl.
| *C09J 7/02* | (2006.01) |
| *C09J 133/06* | (2006.01) |
| *C08K 5/3477* | (2006.01) |
| *C08F 265/04* | (2006.01) |
| *C08F 265/06* | (2006.01) |
| *C08F 290/06* | (2006.01) |
| *C08F 299/02* | (2006.01) |
| *C08L 51/00* | (2006.01) |
| *C09J 151/00* | (2006.01) |
| *C09J 133/08* | (2006.01) |

(52) U.S. Cl.
CPC .......... *C08F 290/06* (2013.01); *C08F 265/04* (2013.01); *C08F 265/06* (2013.01); *C08F 290/061* (2013.01); *C08F 299/02* (2013.01); *C08K 5/3477* (2013.01); *C08L 51/003* (2013.01); *C09J 151/003* (2013.01); *C09J 7/0217* (2013.01); *C09J 133/08* (2013.01); *C09J 2201/606* (2013.01); *C09J 2433/00* (2013.01); *Y10T 428/2809* (2015.01); *Y10T 428/2852* (2015.01); *Y10T 428/2891* (2015.01)

(58) Field of Classification Search
None
See application file for complete search history.

(56) References Cited

U.S. PATENT DOCUMENTS

| 4,737,559 | A | | 4/1988 | Kellen et al. | |
| 4,843,111 | A | * | 6/1989 | Yokoshima et al. ............ | 522/42 |
| 4,920,037 | A | * | 4/1990 | Takahashi et al. ......... | 430/287.1 |
| 5,128,386 | A | | 7/1992 | Rehmer et al. | |
| 5,264,533 | A | | 11/1993 | Rehmer et al. | |
| 5,389,699 | A | | 2/1995 | Rehmer et al. | |
| 6,509,076 | B1 | * | 1/2003 | Otaki et al. .................. | 428/40.1 |
| 6,833,041 | B1 | | 12/2004 | Meyer-Roscher et al. | |
| 7,070,051 | B2 | * | 7/2006 | Kanner et al. ................ | 206/382 |
| 7,122,293 | B2 | * | 10/2006 | Sugasaki et al. .......... | 430/273.1 |
| 2004/0126592 | A1 | * | 7/2004 | Shibahara et al. ............ | 428/441 |
| 2004/0127594 | A1 | | 7/2004 | Yang et al. | |
| 2004/0232563 | A1 | * | 11/2004 | Sumi et al. .................... | 257/783 |
| 2004/0249186 | A1 | | 12/2004 | Balzer et al. | |
| 2005/0191507 | A1 | | 9/2005 | Yang et al. | |
| 2005/0208736 | A1 | * | 9/2005 | Matsumura et al. ......... | 438/460 |
| 2006/0027316 | A1 | | 2/2006 | Jung et al. | |
| 2006/0069177 | A1 | * | 3/2006 | Sachdev et al. ................ | 522/73 |
| 2006/0162857 | A1 | * | 7/2006 | Nagamoto et al. ........ | 156/272.8 |
| 2007/0054088 | A1 | * | 3/2007 | Matijasic et al. ............ | 428/123 |
| 2007/0276096 | A1 | * | 11/2007 | Wefer et al. ................. | 525/298 |
| 2007/0287854 | A1 | | 12/2007 | Balzer et al. | |

FOREIGN PATENT DOCUMENTS

| DE | 101 50 486 | | 4/2003 |
| DE | 10310889 A1 | * | 9/2004 |
| EP | 0 246 848 | | 11/1987 |
| EP | 0 377 199 | | 7/1990 |
| EP | 0 628 616 | | 12/1994 |
| EP | 1 469 036 | | 10/2004 |
| EP | 1 578 823 | | 7/2006 |
| JP | 8-216322 A | | 8/1996 |
| JP | 11-152451 A | | 6/1999 |
| JP | 2006-510788 A | | 3/2006 |
| JP | 2006-241215 A | | 9/2006 |
| WO | WO 2004/058834 A1 | | 7/2004 |
| WO | 2004 081133 | | 9/2004 |
| WO | WO 2004083302 A1 | * | 9/2004 |

OTHER PUBLICATIONS

Machine translation of DE 10310889 A1 (2004).*
Human translation of DE 10310889 A1 (2004).*
SciFinder search for tricyclodecane isomer 1 (2011).*
SciFinder search for tricyclodecane isomer 2 (2011).*
SciFinder search for tricyclodecane isomer 3 (2011).*
SciFinder search for tricyclodecane isomer 4 (2011).*
Scifinder search for isocyanurate (2011).*
U.S. Appl. No. 12/933,209, filed Sep. 17, 2010, Beyers, et al.
Japanese Office Action issued Apr. 30, 2013 in Patent Application No. 2009-533878 (English Translation only).

* cited by examiner

*Primary Examiner* — Frank D Ducheneaux
(74) *Attorney, Agent, or Firm* — Oblon, McClelland, Maier & Neustadt, L.L.P.

(57) ABSTRACT

A mixture having (A) a polymer obtain by polymerizing at least one free-radically polymerizable compound; and (B) at least one compound having at least one ethylenically unsaturated, free-radically polymerizable group and having a weight-average molecular weight Mw of less than 5000 g/mol, wherein at least 10% by weight of compounds (B) are one or more compounds B1 with at least one nonaromatic ring system.

23 Claims, No Drawings

RADIATION-CURABLE MIXTURE CONTAINING LOW-MOLECULAR, ETHYLENICALLY UNSATURATED COMPOUNDS HAVING NON-AROMATIC RING SYSTEMS

The invention relates to a mixture comprising
A) a polymer obtainable by polymerizing free-radically polymerizable compounds, and
B) compounds containing ethylenically unsaturated, free-radically polymerizable groups (polymerizable groups for short) and having a weight-average molecular weight Mw of less than 5000 g/mol,
wherein at least 10% by weight of the compounds B are compounds B1 containing at least one nonaromatic ring system.

The invention relates in particular to the use of the mixture as a pressure-sensitive adhesive.

BACKGROUND OF THE INVENTION

As pressure-sensitive adhesive use is made inter alia of solvent-free polyacrylates or aqueous polyacrylate dispersions.

In the case of aqueous polymer dispersions a drying is necessary for the purpose of removing the water.

The desire is therefore for solvent-free pressure-sensitive adhesives.

Radiation-crosslinkable polymers and their use as an adhesive, e.g., as a hotmelt pressure-sensitive adhesive, are known, for example from EP-A-246 848 or EP-A-377 199.

In the case of radiation-crosslinkable pressure-sensitive adhesives (PSAs) the cohesion, i.e., the internal strength of the adhesive layer, after the adhesive has been coated onto a backing, is achieved by means of subsequent, photochemically induced crosslinking.

Adhesion (sticking to the substrate) and cohesion are divergent performance properties. Measures which bring about an improvement in the adhesion generally lead at the same time to a deterioration in the cohesion, and vice versa.

The desire is therefore for measures which improve both the cohesion and the adhesion, but at least do not improve one of the two properties at the expense of the other. Also of importance is a high level of thermal stability on the part of the adhesive bond; that is, the bond should withstand mechanical loads even at relatively high temperatures. Particularly in the case of industrial applications, and especially with adhesive assembly tapes, high thermal stability is often critical to the use of an adhesive.

Particular applications require high layer thicknesses of the pressure-sensitive adhesive.

Radiation-crosslinkable pressure-sensitive adhesives often have the drawback here that effective adhesion and cohesion are no longer achieved at high layer thicknesses.

WO 2004/081133, EP-A 1 578 823, EP-A 628 616 and EP-A 1 469 036 disclose mixtures of radiation-curable polyacrylates and oligomers containing two or more acrylic groups, and also disclose the use of these mixtures as pressure-sensitive adhesives.

It was an object of the present invention to improve the cohesion in conjunction with effective or sufficient adhesion, and also an effective heat stability, not least at high layer thicknesses of the pressure-sensitive adhesive.

BRIEF SUMMARY OF THE INVENTION

Found accordingly have been the mixture defined below and its use as a pressure-sensitive adhesive.

The mixture comprises
A) a polymer obtained by polymerizing at least one free-radically polymerizable compound, and
B) at least one compound comprising at least one ethylenically unsaturated, free-radically polymerizable group (polymerizable groups for short) and having a weight-average molecular weight Mw of less than 5000 g/mol,
wherein at least 10% by weight of the compounds B are at least one compound B1 comprising at least one nonaromatic ring system.

The mixture of the invention comprises as essential constituents polymers A) and compounds B).

DETAILED DESCRIPTION OF THE INVENTION

Regarding the Polymers A):

The polymer A) is preferably synthesized from free-radically polymerizable compounds (monomers).

Preferably the polymer is composed of at least 40%, more preferably at least 60% and very preferably at least 80% by weight of what are called principal monomers.

The principal monomers are selected from C1-C20 alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and 1 or 2 double bonds, or mixtures of these monomers.

Examples include (meth)acrylic acid alkyl esters having a C1-C10 alkyl radical, such as methyl methacrylate, methyl acrylate, n-butyl acrylate, ethyl acrylate and 2-ethylhexyl acrylate.

In particular, mixtures of the (meth)acrylic acid alkyl esters are also suitable.

Vinyl esters of carboxylic acids having 1 to 20 carbon atoms are for example vinyl laurate, vinyl stearate, vinyl propionate, Versatic acid vinyl esters, and vinyl acetate.

Suitable vinylaromatic compounds include vinyltoluene a- and p-methylstyrene, a-butylstyrene, 4-n-butylstyrene, 4-n-decylstyrene and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of vinyl ethers include vinyl methyl ether or vinyl isobutyl ether. Preference is given to vinyl ethers of alcohols comprising 1 to 4 carbon atoms.

As hydrocarbons having 2 to 8 carbon atoms and one or two olefinic double bonds mention may be made of butadiene, isoprene and chloroprene, ethylene or propylene.

Preferred principal monomers are the C1 to C10 alkyl acrylates and methacrylates, especially C1 to C8 alkyl acrylates and methacrylates, the acrylates in each case being particularly preferred.

Very particular preference is given to methyl acrylate, ethyl acrylate, n-butyl acrylate, n-hexyl acrylate, octyl acrylate and 2-ethylhexyl acrylate, and mixtures of these monomers.

Besides the principal monomers the polymer may comprise further monomers, e.g., monomers having carboxylic acid, sulfonic acid or phosphonic acid groups. Carboxylic acid groups are preferred. Mention may be made, for example, of acrylic acid, methacrylic acid, itaconic acid, maleic acid or fumaric acid.

Further monomers include, for example, monomers comprising hydroxyl groups, especially C1-C10 hydroxyalkyl (meth)acrylates, (meth)acrylamide, and monomers comprising ureido groups, such as ureido (meth)acrylates.

Further monomers that may be mentioned include, moreover, phenyloxyethyl glycol mono(meth)acrylate, glycidyl acrylate, glycidyl methacrylate, and amino (meth)acrylates such as 2-aminoethyl (meth)acrylate.

Monomers which in addition to the double bond carry further functional groups as well, e.g., isocyanato-, amino-, hydroxy-, amide- or glycidyl-, may have the effect, for example, of improving the substrate adhesion. Those suitable include, in particular, cyclic lactams such as N-vinylpyrrolidone or N-vinylcaprolactam.

The polymer is preferably synthesized from at least 40%, more preferably at least 60% and very preferably at least 80% by weight of C1-C20 alkyl (meth)acrylates, especially the abovementioned alkyl (meth)acrylates.

The polymer in question is preferably a polymer which is crosslinkable by irradiation with high-energy light, e.g., UV light, or electron beams.

The polymer is crosslinkable thus if, for example, hydrogen protons can be detached from the main chain of the polymer photochemically, including in particular through the use of a photoinitiator or as a result of electron beams, thereby producing a free radical which is able to enter into further chemical reactions.

The mixture preferably comprises a photoinitiator.

The photoinitiator may comprise, for example, what are called α-splitters; that is, photoinitiators in which a chemical bond is cleaved to form 2 free radicals which initiate the further crosslinking or polymerization reactions.

Examples that may be mentioned include acylphosphine oxides (LUCIRIN® products from BASF), hydroxyalkylphenones (e.g., IRGACURE® 184 hydroxyalkylphenones), benzoin derivatives, benzil derivatives, and dialkyloxyacetophenones.

In particular the compounds in question may be what are called H abstractors, which detach a hydrogen atom from the polymer chain; these are, for example, photoinitiators having a carbonyl group. This carbonyl group is inserted into a C—H bond to form a C—C—O—H moiety.

Here mention may be made in particular of acetophenone, benzophenone and derivatives thereof.

It is possible to use both classes of photoinitiators alone or else in a mixture.

In one particular embodiment the photoinitiator or at least one of the photoinitiators, if a mixture is used, is attached to the polymer A).

With particular preference the photoinitiator in question is a photoinitiator which is incorporated into the polymer chain by means of free-radical copolymerization. For that purpose the photoinitiator preferably comprises an acrylic or (meth)acrylic group.

Suitable copolymerizable photoinitiators are acetophenone derivatives or benzophenone derivatives which comprise at least one, preferably one, ethylenically unsaturated group. The ethylenically unsaturated group is preferably an acrylic or methacrylic group.

The ethylenically unsaturated group may be attached directly to the phenyl ring of the acetophenone derivative or benzophenone derivative. In general there is a spacer group located between phenyl ring and ethylenically unsaturated group. The spacer group may comprise, for example, up to 100 carbon atoms.

Suitable acetophenone derivatives or benzophenone derivatives are described for example in EP-A-346 734, EP-A-377 199 (1st claim), DE-A-4 037 079 (1st claim) and DE-A-3 844 444 (1st claim) and by this reference are also disclosed in the present application. Preferred acetophenone derivatives and benzophenone derivatives are those of the formula

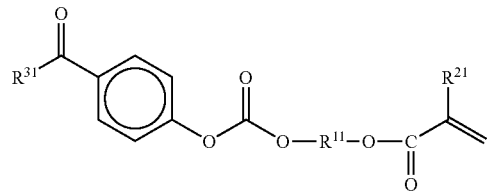

in which R11 stands for an organic radical having up to 30 carbon atoms, R21 for a hydrogen atom or a methyl group, and R3 for an optionally substituted phenyl group or a C1-C4 alkyl group.

R11 stands with particular preference for an alkylene group, especially for a C2-C8 alkylene group.

R31 stands with particular preference for a methyl group or a phenyl group.

The mixture of the invention comprises preferably 0.0001 to 0.5 mol, more preferably 0.0002 to 0.1, very preferably 0.003 to 0.01 mol of the photoinitiator, or of the molecule group which is active as a photoinitiator and is attached to the polymer, per 100 g of the sum by weight of A)+B).

The polymer A) preferably has a K value of 10 to 100, in particular of 30 to 80, more preferably of 40 to 60, measured in tetrahydrofuran (1% strength solution, 21° C.).

The K value according to Fikentscher is a measure of the molecular weight and viscosity of the polymer.

The molar weight associated with the above K value range is far higher than the molar weight of the compounds B). The average molar weight (both the number-average and the weight average) of the polymer A) is generally at least twice and in particular at least 10 times as high as that of the compounds B).

The glass transition temperature (Tg) of the polymer A) is preferably −60 to +10° C., more preferably −55 to 0° C., very preferably −55 to −10° C.

The glass transition temperature of the polymer can be determined in accordance with customary methods such as differential thermoanalysis or differential scanning calorimetry (see, e.g., ASTM 3418/82, midpoint temperature).

Polymers A) can be prepared by copolymerizing the monomeric components with the use of the customary polymerization initiators and also, where appropriate, of regulators, polymerization taking place at the customary temperatures in bulk, in emulsion, e.g., in water or liquid hydrocarbons, or in solution. Preferably the polymers are prepared by polymerizing the monomers in solvents (solution polymerization), particularly in solvents with a boiling range of 50 to 150° C., preferably from 60 to 120° C., using the customary amounts of polymerization initiators, which are generally 0.01% to 10%, in particular 0.1% to 4% by weight, based on the total weight of the monomers. Suitable solvents include in particular, alcohols, such as methanol, ethanol, n- and isopropanol, n- and isobutanol, preferably isopropanol and/or isobutanol, and hydrocarbons such as toluene and, in particular, benzenes with a boiling range of 60 to 120° C. It is also possible to use ketones, such as acetone, methyl ethyl ketone and methyl isobutyl ketone, and esters, such as ethyl acetate, and also mixtures of solvents of the type stated, preference being given to mixtures which comprise isopropanol and/or isobutanol in amounts of 5% to 95%, in particular of 10% to 80%, preferably of 25% to 60% by weight, based on the solution mixture used.

Suitable polymerization initiators for solution polymerization include for example azo compounds, ketone peroxides and alkyl peroxides.

After the polymerization in solution the solvents can if appropriate be separated off under reduced pressure, in which case operation takes place at elevated temperatures, in the range of 100 to 150° C. for example. The polymers can then be used in the solvent-free state, i.e., as melts. In some cases it is also of advantage to prepare the polymers by polymerization in bulk, i.e., without the use of a solvent, in which case operation may take place batchwise or else continuously, in accordance with the details of U.S. Pat. No. 4,042,768, for example.

Regarding the Compounds B)

Compounds B) are compounds containing ethylenically unsaturated, free-radically polymerizable groups (polymerizable group for short) and having a weight-average molecular weight, Mw, of less than 5000 g/mol.

The key feature is that at least 10% by weight of the compounds B are compounds containing at least one nonaromatic ring system, referred to below as compounds B1.

Suitable nonaromatic ring systems include cycloaliphatic ring systems and heterocyclic systems, especially those which as well as carbon contain nitrogen.

Suitable cycloaliphatic ring systems include single ring systems, such as a cyclohexane ring, or else bicyclic or polycyclic ring systems, such as ring systems comprising two six-membered carbon rings, two five-membered carbon rings, or one six-membered carbon ring and one five-membered carbon ring; in that case it is possible for a further carbon bridge to be formed in each case between two C atoms of the ring system.

Through simple reactions it is possible to attach free-radically polymerizable groups (especially vinyl or acrylic and/or methacrylic groups) to such ring systems, directly or, if appropriate, via a spacer.

Suitable compounds B1 containing cycloaliphatic ring systems and polymerizable groups are available under the trade name SARTOMER® or LAROMER®.

As a heterocyclic ring system mention may be made in particular of the isocyanurate ring.

Isocyanurates can be obtained by trimerizing monoisocyanates or polyisocyanates, especially diisocyanates. Other preparation methods are known as well, examples being those which start from isocyanuric acid.

The isocyanurate ring is formed by a total of three isocyanate groups. In the case of trimerized polyisocyanates, one isocyanate group of the polyisocyanate or diisocyanate is part of the ring, while the other isocyanate groups are free and are available for further reactions. The free isocyanate groups can easily be reacted with compounds which comprise free-radically polymerizable groups. One very simple reaction, for example, is that with hydroxyalkyl acrylates. In the case of trimerized monoisocyanates, the isocyanurate ring is formed from the three isocyanate groups present. The free-radically polymerizable groups are attached by reaction with suitable other functional groups of the monoisocyanates.

Preferred isocyanurates are the isocyanurates of the customary diisocyanates.

Mention may be made in particular of diisocyanates X(NCO)2, where X is an aliphatic hydrocarbon radical having 4 to 15 carbon atoms, a cycloaliphatic or aromatic hydrocarbon radical having 6 to 15 carbon atoms or an araliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethyl-cyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyana-totoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomer, and mixtures of these compounds.

Particularly preferred compounds B1 are the above isocyanurates which comprise (meth)acrylic groups through reaction with suitable reactive compounds, in particular with hydroxyalkyl (meth)acrylates.

As well as the nonaromatic ring system, compounds B1 may also comprise aromatic ring systems or aliphatic molecule groups.

At least 5% by weight of compounds B1, based on their molar mass, is composed, preferably, of carbon atoms or nitrogen atoms which are part of a ring system. Only the atoms which form the ring are taken into account, not the substituents of these atoms; the isocyanurate ring, for example, is formed by three carbon and three nitrogen atoms (36+42=78 g); this value is placed in relation to the total molar mass.

At least 7% by weight, in particular at least 10% by weight, with very particular preference at least 15% by weight, and in one particular embodiment at least 20% by weight of compounds B1, based on their molar mass, is composed, with particular preference, of carbon or nitrogen atoms which are part of a ring system. Preferably not more than 70% by weight, more preferably not more than 50% by weight, or not more than 45% by weight, and very preferably not more than 35% by weight, of compounds B1 is composed of carbon or nitrogen atoms which are part of a ring system.

Suitable compounds B1 having an isocyanurate ring and polymerizable groups are likewise available under the trade names SARTOMER® or LAROMER®.

Compounds B may comprise further compounds as well as compounds B1.

Preferably at least 30% by weight, more preferably at least 50% by weight, very preferably at least 80% by weight, and in particular 100% by weight of the compounds B are compounds B1.

Suitable compounds B) include other compounds besides B1.

Mention may be made, for example, of the monomers recited above, from which the polymer A) may be synthesized. Particular mention may be made of acrylic monomers containing an acrylic or methacrylic group.

Mention may be made in particular of (meth)acrylate compounds having two or more acrylic groups.

As (meth)acrylate compounds mention may be made of (meth)acrylic esters and especially acrylic esters of polyfunctional alcohols, particularly those which other than the hydroxyl groups comprise no further functional groups, or ether groups if any at all. Examples of such alcohols are, for example, difunctional alcohols, such as ethylene glycol, propylene glycol, and their representatives with higher degrees of condensation, for example such as diethylene glycol, triethylene glycol, dipropylene glycol, tripropylene glycol, etc., butanediol, pentanediol, hexanediol, neopentyl glycol, alkoxylated phenolic compounds, such as ethoxylated and/or propoxylated bisphenols, cyclohexanedimethanol, trifunctional and higher polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, especially ethoxylated and propoxylated, alcohols.

The alkoxylation products are obtainable in known manner by reacting the above alcohols with alkylene oxides, especially ethylene oxide or propylene oxide. The degree of alkoxylation per hydroxyl group is preferably 0 to 10, i.e., 1 mol of hydroxyl group can be alkoxylated preferably with up to 10 mol of alkylene oxides.

As (meth)acrylate compounds mention may be made, moreover, of polyester (meth)acrylates, which are the (meth) acrylic esters of polyesterols.

Examples of suitable polyesterols include those as may be prepared by esterifying polycarboxylic acids, preferably dicarboxylic acids, with polyols, preferably diols. The starting materials for such hydroxyl-containing polyesters are known to the skilled worker. As dicarboxylic acids use may be made preferably of succinic acid, glutaric acid, adipic acid, sebacic acid, o-phthalic acid, their isomers and hydrogenation products and also esterifiable derivatives, such as anhydrides or dialkyl esters of said acids. Suitable polyols include the abovementioned alcohols, preferably ethylene glycol, propylene 1,2- and 1,3-glycol, butane-1,4-diol, hexane-1,6-diol, neopentyl glycol, cyclohexanedimethanol, and also polyglycols of the ethylene glycol and propylene glycol type.

Polyester (meth)acrylates can be prepared in a plurality of stages or else in single-stage form, as described for example in EP 279 303, from acrylic acid, polycarboxylic acid, and polyol.

Additionally compounds B) may be, for example, epoxy (meth)acrylates or urethane (meth)acrylates.

Epoxy (meth)acrylates are, for example, those as obtainable by reacting epoxidized olefins or poly- and mono- or diglycidyl ethers, such as bisphenol A diglycidyl ether, with (meth)acrylic acid.

The reaction is known to the skilled worker and described for example in R. Holmann, U.V. and E.B. Curing Formulation for Printing Inks and Paints, London 1984.

Urethane (meth)acrylates are, in particular, reaction products of hydroxyalkyl (meth)acrylates with poly- and/or diisocyanates (see likewise R. Holmann, U.V. and E.B. Curing Formulation for Printing Inks and Paints, London 1984).

The following statements apply to all compounds B, irrespective of whether they are exclusively compounds B1 or are mixtures of B1 with other compounds B.

Compounds B) are preferably liquid at 21° C. and 1 bar; if the compounds are solid at 21° C. and 1 bar they ought to dissolve well in the polymer A).

The viscosity of the compounds B, or of the mixture of the compounds B, is preferably 0.01 to 50 Pas, more preferably 0.04 to 10 Pas at 23° C., 1 bar, measured in accordance with DIN EN ISO 3219; with very particular preference the viscosity is 0.04 to 2 and in particular 0.04 to 1 Pas.

The weight-average molecular weight Mw of the compounds B is preferably below 5000, more preferably below 3000 g/mol (determined by gel permeation chromatography with polystyrene as standard and tetrahydrofuran as eluent). With very particular preference it is below 2000 g/mol.

On average compounds B have 1 to 5, preferably 1.5 to 3, more preferably 2 to 3, in one particular embodiment 2 to 2.5 polymerizable groups per molecule.

Regarding the Mixture of A) and B)

The mixture of A) and B) is suitable as a binder for pressure-sensitive adhesives, for example the weight fraction of A) being preferably not more than 99%, more preferably not more than 95% and preferably at least 30%, more preferably at least 50% or at least 60% by weight.

Correspondingly the weight fraction of B) is preferably not more than 70%, more preferably not more than 50% or not more than 40%, and preferably at least 1%, more preferably at least 5%, by weight.

Suitable weight ranges of A) and B) are in particular:
for A): 99% to 30%, more preferably 95% to 50%, very preferably 95% to 60%, and in particular 95% to 70% by weight
for B): correspondingly, 1% to 70%, more preferably 5% to 50%, very preferably 5% to 40%, and in particular 5% to 30% by weight.

All of the weight figures for A) and B) are based on the sum by weight of A) and B).

The mixture of A) and B) can be prepared by customary methods.

Preferably polymer A) is heated, to temperatures for example between 50 and 130° C., and compounds A), together if appropriate with further additives, are incorporated with stirring.

Regarding the Pressure-Sensitive Adhesive Utility

The mixture is suitable as a binder for pressure-sensitive adhesives. The pressure-sensitive adhesives may be composed solely of the mixture of A) and B).

Particularly suitable are hotmelt PSAs, in which water or other solvents, from the solution polymerization of A), for example, are present, if at all, in small amounts, and which are applied from the melt.

Preferably the pressure-sensitive adhesive, or hotmelt PSA, comprises less than 5 parts, in particular less than 2 parts or 1 part by weight of water and/or solvent per 100 parts by weight of the sum by weight of A) and B). With particular preference the pressure-sensitive adhesive, or hotmelt PSA, is substantially free from water and other solvents.

Preferably the pressure-sensitive adhesive comprises at least one photoinitiator (see above). Where the photoinitiator is not a photoinitiator which is attached to the polymer, the photoinitiator may be added at any time to the mixture of A) and B) or to the actual components A) or B).

Further additives which may be added to the pressure-sensitive adhesive are, for example, fillers, dyes, flow control assistants and, in particular, tackifiers (tackifying resins).

Tackifiers are, for example, natural resins, such as rosins and their derivatives formed by disproportionation or isomerization, polymerization, dimerization or hydrogenation. They may be in their salt form (with monovalent or polyvalent counterions (cations), for example) or, preferably, in their esterified form. Alcohols which can be used for the esterification may be monohydric or polyhydric. Examples are methanol, ethanediol, diethylene glycol, triethylene glycol, 1,2,3-propanethiol and pentaerythritol.

Additionally use is also made of hydrocarbon resins, e.g., coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, a-methylstyrene, vinyltoluene.

As tackifiers use is also being made increasingly of polyacrylates which have a low molar weight. Preferably these polyacrylates have a weight-average molecular weight Mw of below 30 000. The polyacrylates are composed preferably of at least 60%, in particular at least 80%, by weight of C1-C8 alkyl (meth)acrylates.

Preferred tackifiers are natural or chemically modified rosins. Rosins are composed predominantly of abietic acid or derivatives of abietic acid.

The amount by weight of the tackifiers is for example 5 parts to 100 parts by weight, more preferably 10 parts to 50 parts by weight, based on 100 parts by weight of the sum by weight of A)+B).

The pressure-sensitive adhesives are preferably used as hotmelt pressure-sensitive adhesives; that is, they are applied from the melt to the desired backings.

In particular the pressure-sensitive or hotmelt adhesives of the invention are suitable for producing self-adhesive articles, such as labels, adhesive tapes or adhesive sheets, examples being protective films.

The self-adhesive articles are generally composed of a backing and a layer of the adhesive applied to one or both sides, preferably one side.

The backing material may be, for example, paper, polymeric films of polyolefins or PVC.

The self-adhesive articles are produced in particular by applying the pressure-sensitive adhesive to the backing and then effecting crosslinking with UV light or electron beams.

A particular advantage of the invention is that self-adhesive articles can be produced at high application rates, i.e. with thick pressure-sensitive adhesive layers.

The application rate may amount in particular to 10 to 300 g, preferably 10 to 150 g, and generally often 20 to 80 g per square meter of backing.

The coated backing is exposed to high-energy light, preferably UV light, in order to achieve the desired crosslinking. The radiation energy can amount for example to 10 mJ/cm2 to 1 500 mJ/cm2 of irradiated area.

Preferred self-adhesive articles are labels or adhesive assembly tapes.

Preference is also given to protective films. The protective film is intended to protect articles in the course of transit or storage. The protective films can be pulled off again from the article by hand without residue.

The self-adhesive articles are suitable for a very wide variety of substrates. The substrates may, for example, be of metals, paper, card, wood, plastics, etc.

In general, very good adhesion and particularly high cohesion are achieved, even at relatively high layer thickness.

In particular the thermal stability is also improved, i.e., the adhesive bonds hold even at high temperatures. The mixtures or pressure-sensitive adhesives of the invention are also particularly suitable for adhesive assembly tapes which find use in the industrial production of, for example, motor vehicles.

EXAMPLE 1

UV-Crosslinkable Polymer

A polymerization apparatus composed of a glass reactor with heating/cooling circuit, stirrer, thermocouple, reflux condenser, nitrogen inlet and metering vessels is charged under a gentle stream of nitrogen with 364 g of methyl ethyl ketone (MEK) and this initial charge is heated to 80° C. 100 g of a monomer mixture consisting of 94.8% n-butyl acrylate, 5% acrylic acid and 0.18% of a photoinitiator of the formula I are added. When 80° C. have been regained, 4.9 g of an initiator solution of 13.07 g tert-butyl perpivalate and 86.7 g of MEK are added and initial polymerization takes place for 10 minutes. Then 1906 g of monomer mixture are run in over 3 hours and 94.75 g of initiator solution over 3 hours 15 minutes. Subsequently, a solution of 6.4 g of tert-butyl perpivalate in 41.6 g of MEK is added over 5 minutes and the temperature is raised to 85° C., and full polymerization takes place for 45 minutes. Then 0.6 g of 2,6-di-tert-butyl-p-cresol is added and the solution is cooled and discharged.

Solids content: 80.3% K value: 49.2

EXAMPLE 2

Mixture with Isocyanurate 990 g of polymer solution from Example 1 are admixed with 0.0031 g of 4-hydroxy Tempo and the mixture is freed from the solvent under reduced pressure and, in the course of that procedure, heated to 135° C. The polymer is cooled to 110° C. and admixed with 62.4 g of a triacrylate of the hexamethylene diisocyanate trimer (isocyanurate composed of 3 molecules of hexamethylene diisocyanate and 3 molecules of hydroxyethyl acrylate, ring atoms content 9% by weight), preheated to 80° C., and 26.7 g of LUCIRIN® TPO-L initiator and the mixture is stirred for a further hour.

Zero-shear viscosity at 110° C., 78.4 Pas

EXAMPLE 3

Mixture with Cycloaliphate 878 g of polymer solution from Example 1 are admixed with 0.04 g of 4- hydroxyl Tempo, 0.6 g of hydroquinone monomethyl ether, 0.2 g of 2,6-di-tert-butyl-p-cresol and the mixture is freed from the solvent under reduced pressure and, in the course of that procedure, heated to 135° C. The polymer is cooled to 110° C. and admixed with 23.9 g of LUCIRIN® TPO-L initiator and 55.7 g of SARTOMER® SR 833 S monomer, preheated to 80° C., and the mixture is stirred for a further hour, then discharged.

Formula of SARTOMER® SR 833 S monomer (ring atoms content 39% by weight)

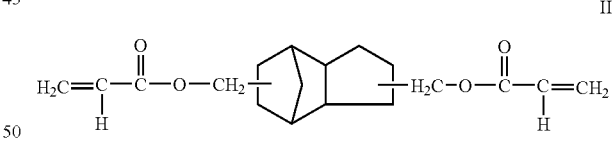

II

Zero-shear viscosity at 110° C.: 90 Pas

EXAMPLE 4

A polymerization apparatus composed of a glass reactor with heating/cooling circuit, stirrer, thermocouple, reflux condenser, nitrogen inlet and metering vessels is charged under a gentle stream of nitrogen with 456 g of methyl ethyl ketone (MEK) and this initial charge is heated to 80° C. 120 g of a monomer mixture consisting of 94.73% n-butyl acrylate, 5% acrylic acid and 0.27% of a photoinitiator of the formula I are added. When 80° C. have been regained, 5.4 g of an initiator solution of 19.3 g tert-butyl perpivalate and 88.8 g of MEK are added and initial polymerization takes place for 10 minutes. Then 2291 g of monomer mixture are run in over 3 hours and 102.6 g of initiator solution over 3 hours 15 minutes. Subsequently, a solution of 6.4 g of tert-butyl perpivalate in 52 g of MEK is added over 5 minutes and the temperature is raised to 85° C., and full polymerization takes place for 45 minutes. The solution is cooled.

Solids content: 80.1% K value: 48.0

EXAMPLE 5

Mixture with Isocyanurate 561 g of polymer solution from Example 4 are admixed with 0.018 g of 4-hydroxy Tempo and freed from the solvent under reduced pressure and, in the course of that procedure, it is heated to 135° C. The polymer is cooled to 110° C. and admixed with 35 g of SARTOMER® SR 368 monomer, preheated to 80° C., and 15 g of LUCIRIN® TPO-L initiator, and the mixture is stirred for a further hour.

Formula of SARTOMER® SR 368 monomer (ring atoms content 18% by weight):

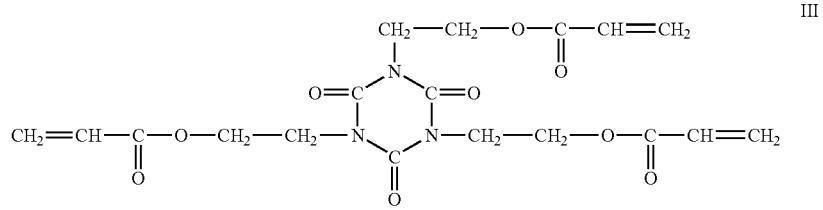 [SMILES: C=CC(=O)OCCn1c(=O)n(CCOC(=O)C=C)c(=O)n(CCOC(=O)C=C)c1=O]

III

Zero-shear viscosity at 110° C.: 46 Pas

EXAMPLE 6

Mixture with Isocyanurate 728 g of polymer solution from Example 4 are admixed with 0.021 g of 4-hydroxy Tempo and the mixture is freed from the solvent under reduced pressure and, in the course of that same procedure, is heated to 135° C. The polymer is cooled to 110° C. and admixed with 57.6 g of a 79% strength acetonic solution of a triacrylate of IPDI trimer (from 3 molecules of isophorone diisocyanate and 3 molecules of hydroxyethyl acrylate, ring atoms content 29% by weight). In addition, 21 g of LUCIRIN® TPO-L initiator are added. Degassing is then continued under reduced pressure at 110° C. for a further 15 minutes. The mixture is discharged.

Zero-shear viscosity at 110° C.: 116 Pas.

COMPARATIVE EXAMPLE 1

536 g of polymer solution from Example 1 are admixed with 0.0018 g of 4-hydroxy Tempo and the mixture is freed from the solvent under reduced pressure and in the course of that same procedure is heated to 135° C. The polymer is cooled to 110° C., admixed with 35.14 g of hexamethylene diacrylate, preheated to 80° C., and with 15 g of LUCIRIN® TPO-L initiator, stirred for 1 hour more, and then discharged.

Zero-shear viscosity at 110° C.: 43 Pas

Test Methods

The mixtures were used without further additions as hot-melt pressure-sensitive adhesives. They were heated to 95° C. and coated directly on to a polyethylene terephthalate (PETP) film by means of a bar coater (adhesive application rate 60 g dry/m2).

Thereafter the coated films were exposed to UV light. The irradiation dose is reported in the table (H spectrum; medium-pressure Hg; 120 W/cm).

Subsequently, the following tests were conducted:

The backing coated with pressure-sensitive adhesive was cut into test strips 25 mm wide. To determine the shear strength the test strips were adhered with a bonded area of 25 mm2 to the steel test surface (Afera steel), rolled on once with a 1 kg roller, stored for 10 minutes (under standard conditions, 50% relative humidity, 1 bar, 23° C.) and then loaded in suspension with a 1 kg weight (under standard conditions). The measure of the shear strength was the time taken for the weight to fall off; in each case the average from 5 measurements was calculated.

For the determination of the peel strength (adhesion) a 2.5 cm wide test strip was bonded to the steel test surface in each case and rolled on once with a 1 kg roller. It was then clamped by one end into the upper jaws of a stress/strain testing apparatus. The adhesive strip was pulled from the test surface at 300 mm/min and an angle of 180°, i.e., the test strip was bent over and pulled off parallel to the metal test plate, and the force required to accomplish this was measured. The measure of the peel strength was the force, in N/2.5 cm, which resulted as the average value from five measurements.

The peel strength was determined 24 hours after bonding. After this time the bond strength has developed fully.

For the SAFT test (shear adhesion failure temperature, heat resistance) the samples were prepared as for the shear test, adhered to steel, but rolled on 4 times using a roller weighing 2 kg, and stored under standard conditions for 16 hours. The samples were then suspended in a controlled-climate drying cabinet and loaded with 1 kg, and the temperature was raised in stages of 0.5° C./min. The measure of the heat resistance is the temperature at which the weight falls off. The figure reported is the average value from three measurements.

TABLE

Results of the tests

| Example | UV-C dose mJ/cm2 | Shear strength Minutes | Peel strength on steel N/25 mm | S.A.F.T Test ° C. |
|---|---|---|---|---|
| Example 2 | 20 |  | 22.6 | 56 |
|  | 30 | 783 | 23.1 | 66 |
|  | 50 |  | 23.3 | 87 |
| Example 3 | 20 | 209 | 27.0 | 84 |
|  | 30 | >6000 | 25.8 |  |
|  | 50 | >6000 | 20.1 | 167 |
| Example 5 | 20 | >6000 | 25.3 | >180 |
|  | 30 | >6000 | 23.4 | >180 |
|  | 50 | >6000 | 17.4 | >180 |

TABLE-continued

Results of the tests

| Example | UV-C dose mJ/cm2 | Shear strength Minutes | Peel strength on steel N/25 mm | S.A.F.T Test ° C. |
|---|---|---|---|---|
| Example 6 | 19 | >6000 | 18.0 | 164 |
| Comparative Example 1 | 20 | 8 | 20.7 | 43 |
|  | 30 | 4 | 19.7 | 47 |
|  | 50 | 33 | 21.1 | 79 |

The invention claimed is:

1. A self-adhesive article, selected from the group consisting of a self-adhesive label, a self-adhesive assembly tape, and a self-adhesive protective film, comprising a pressure-sensitive adhesive mixture, comprising:
(A) an acrylate polymer obtained by polymerizing a polymerizable compound comprising at least 80% by weight of a $C_1$-$C_{20}$ alkyl (meth)acrylate, wherein a photoinitiator is attached to the polymer; and
(B) a compound comprising an ethylenically unsaturated, free-radically polymerizable group and having a weight-average molecular weight Mw of less than 5000 g/mol,
wherein
at least 10% by weight of compound (B) is at least one compound (B1) comprising at least one nonaromatic ring system selected from the group consisting of an isocyanurate ring, and a ring system of the formula

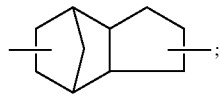

compound B1 has 2 to 3 acrylate groups;
the self-adhesive article can be pulled off from a protected article without residue, and
the pressure-sensitive adhesive mixture is crosslinked with high energy radiation with UV light or an electron beam,
and wherein the self-adhesive article has a peel strength of at least 22.6 N/25 mm.

2. The article of claim 1, wherein the polymer (A) has a K value of 10 to 100 measured in a 1% strength by weight solution of tetrahydrofuran, at 21° C.

3. The article of claim 1, wherein the polymer (A) is a solution polymer.

4. The article of claim 1, wherein the nonaromatic ring system comprises

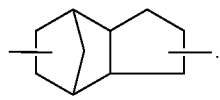

5. The article of claim 1, wherein the nonaromatic ring system of the compound (B1) is the isocyanurate ring system.

6. The article of claim 1, wherein at least 50% by weight of the compound (B) is compound (B1).

7. The article of claim 1, wherein the compound (B1) consists of at least 10% by weight, based on molar mass, of carbon or nitrogen atoms which are part of the ring system.

8. The article of claim 1, wherein the compound (B) comprises on average 1 to 5 polymerizable groups per molecule.

9. The article of claim 1, wherein at least one polymerizable group of the compound (B) is an acrylic group.

10. The article of claim 1, wherein a weight fraction of the compound (B) is 5% to 70% by weight, based on a sum by weight of the polymer (A) and the compound (B).

11. The article of claim 1, further comprising 0.0001 to 0.5 mol of the photoinitiator or of a molecule group which is active as the photoinitiator and is attached to the polymer, per 100 g of a sum by weight of the polymer (A) and the compound (B).

12. The article of claim 1, wherein the mixture comprises less than 5 parts by weight of water or solvent, based on 100 parts by weight of a sum by weight of the polymer (A) and compound (B).

13. The article of claim 1, wherein at least 80% by weight of the compound (B) is compound (B1).

14. The article of claim 1, wherein 100% by weight of the compound (B) is compound (B1).

15. The article of claim 1, wherein at least one polymerizable group of the compound (B) is a methacrylic group.

16. The article of claim 1, wherein all polymerizable groups of the compound (B) are methacrylic groups.

17. The article of claim 1, wherein all polymerizable groups of the compound (B) are acrylic groups.

18. The article of claim 1, wherein the compound B) is liquid at 21° C. and 1 bar.

19. The article of claim 1, wherein
the photoinitiator is attached to the polymer in amounts of 0.0001 to 0.5 mol of a photoinitiator group per 100 g of a sum by weight of the polymer (A) and the compound (B); and
the weight amount of polymer (A) is from 95% to 70% by weight based on the sum by weight of (A) and (B) and the weight amount of compound (B) is from 5% to 30% by weight based on the sum by weight of (A) and (B).

20. The article of claim 1, wherein the self-adhesive article has a peel strength of from 22.6 to 27.0 N/25 mm.

21. The article of claim 1, wherein the pressure-sensitive adhesive mixture comprises:
70 to 95% by weight of the acrylate polymer (A), based on the sum by weight of (A) and (B), comprising at least 80% by weight of n-butylacrylate, wherein the photoinitiator is attached to the polymer in amounts of 0.0002 to 0.01 mol of a photoinitiator group per 100 g of a sum by weight of the polymer (A) and the compound (B); and
5 to 30% by weight of the compound (B), based on the sum by weight of (A) and (B).

22. The article of claim 20, wherein the pressure-sensitive adhesive mixture comprises:
70 to 95% by weight of the acrylate polymer (A), based on the sum by weight of (A) and (B), comprising at least 80% by weight of n-butylacrylate, wherein the photoinitiator is attached to the polymer in amounts of 0.0002 to 0.01 mol of a photoinitiator group per 100 g of a sum by weight of the polymer (A) and the compound (B); and
5 to 30% by weight of the compound (B), based on the sum by weight of (A) and (B).

23. A method of producing the article of claim 1, the method comprising:
applying the mixture to a backing; and
exposing the mixture to high-energy radiation.

* * * * *